(12) United States Patent
Lee et al.

(10) Patent No.: US 9,100,682 B2
(45) Date of Patent: Aug. 4, 2015

(54) TERRESTRIAL BROADCASTING RECEIVING MODULE

(75) Inventors: Yong Bum Lee, Gyunggi-do (KR); Jong Lae Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 977 days.

(21) Appl. No.: 13/221,768

(22) Filed: Aug. 30, 2011

(65) Prior Publication Data

US 2012/0309335 A1 Dec. 6, 2012

(30) Foreign Application Priority Data

May 31, 2011 (KR) .................. 10-2011-0052308

(51) Int. Cl.
  *H04B 1/18* (2006.01)
  *H04N 21/414* (2011.01)
  *H04N 21/426* (2011.01)
  *H04N 21/61* (2011.01)

(52) U.S. Cl.
  CPC ... *H04N 21/41407* (2013.01); *H04N 21/42638* (2013.01); *H04N 21/6112* (2013.01)

(58) Field of Classification Search
  USPC ........ 455/132, 188.1, 188.2, 189.1, 270, 280, 455/286, 288; 348/725
  See application file for complete search history.

(56) References Cited

U.S. PATENT DOCUMENTS 3,631,348 A * 12/1971 Lehmann ..................... 455/142
4,173,742 A * 11/1979 Lehmann ..................... 333/100
6,925,291 B2 * 8/2005 Pugel ........................ 455/191.1
6,950,152 B2 * 9/2005 Yamamoto .................... 348/731
7,139,039 B2 * 11/2006 Yamamoto .................... 348/731
7,831,198 B2 * 11/2010 Kishida et al. ............... 455/3.02
8,050,634 B2 * 11/2011 Olsson et al. .................. 455/78
8,509,718 B2 * 8/2013 Khlat et al. ................ 455/193.1

FOREIGN PATENT DOCUMENTS

CN       101720002 A      6/2010
KR    10-2004-0034217      4/2004
KR    10-2006-0010346      2/2006

OTHER PUBLICATIONS

Office Action dated Oct. 16, 2012 for related Korean patent application No. 10-2011-0052308 and an English Summary.
Office Action dated Jul. 3, 2014 for corresponding Chinese Patent Application No. 201110281515.X and its English summary provided by Applicant's foreign counsel.

* cited by examiner

Primary Examiner — Blane J Jackson
(74) Attorney, Agent, or Firm — Ladas & Parry, LLP (57) ABSTRACT

Disclosed herein is a terrestrial broadcasting receiving module including: an antenna receiving a wireless signal; a distributing unit distributing and outputting the wireless signal into a wireless signal including a VHF band signal and a wireless signal including a UHF band signal; a VHF processing unit generating and outputting a VHF intermediate frequency signal from the wireless signal including the VHF band signal; a UHF processing unit generating and outputting a UHF intermediate frequency signal from the wireless signal including the UHF band signal; and a demodulating unit demodulating the VHF intermediate frequency signal output from the VHF processing unit and the UHF intermediate frequency signal output from the UHF processing unit. Therefore, a manufacturing cost may be reduced, switching loss may be prevented.

8 Claims, 6 Drawing Sheets
(2 of 6 Drawing Sheet(s) Filed in Color)

TERRESTRIAL BROADCASTING RECEIVING MODULE

CROSS REFERENCE TO RELATED APPLICATION

This application claims the benefit of Korean Patent Application No. 10-2011-0052308, filed on May 31, 2011, entitled "Terrestrial Broadcasting Receiver", which is hereby incorporated by reference in its entirety into this application.

BACKGROUND OF THE INVENTION

1. Technical Field

The present invention relates to a terrestrial broadcasting receiving module.

2. Description of the Related Art

As a terrestrial broadcasting standard, there is a national television system committee (NTSC) scheme, which is an analog scheme, used in the Republic of Korea and the United States of America or an advanced television system committee (ATSC) scheme, which is a digital scheme.

As other analog schemes, there are a phase alternation line system (PAL) scheme, a sequential color with memory (SECAM) scheme, and the like, and as other digital scheme, there are a digital video broadcasting-terrestrial (DVB-T) scheme, an integrated services digital broadcasting-terrestrial (ISDB-T) scheme, and the like.

A portable device includes a receiving module appropriate for receiving and modulating/demodulating these terrestrial broadcasting standards, thereby making it possible to receive terrestrial broadcasting. However, since mobility becomes important in the portable device, when the portable device receives these terrestrial broadcasting standards, a receiving rate is deteriorated.

Therefore, terrestrial broadcasting standards appropriate for the portable device have been suggested. As these terrestrial broadcasting standards, there are a terrestrial-digital multimedia broadcasting (T-DMB) scheme, a digital video broadcasting-handheld (DVB-H) scheme, an integrated services digital broadcasting-terrestrial (ISDB-T) scheme, a 1 seg scheme, a China multimedia mobile broadcasting (CMMB) scheme, an advanced television systems committee-mobile/handheld (ATSC-M/H), and the like.

In order to receive these suggested standards of terrestrial broadcastings, the portable device requires an antenna and a receiving circuit. To this end, a scheme of configuring a receiving device so as to include an antenna for receiving a very high frequency (VHF) band signal and an antenna for receiving an ultra high frequency (UHF) band signal, that is, two antennas or a scheme of configuring a receiving device so as to include a single antenna and a radio frequency (RF) switch to thereby separate a signal into a VHF band and a UHF band through the RF switch has been used.

According to the related art, when the antennas are individually used, loss is minimized and a circuit configuration is also simple; however, a manufacturing cost of a product increases.

In addition, when a single antenna is used and a signal is separated using the RF switch, a manufacturing cost of a product decreases; however, loss is generated at the time of switching.

SUMMARY OF THE INVENTION

The present invention has been made in an effort to provide a terrestrial broadcasting receiving module in which a single antennal is used and a signal received in the antenna is distributed without using a switch.

According to a preferred embodiment of the present invention, there is provided a terrestrial broadcasting receiving module including: an antenna receiving a wireless signal including a very high frequency (VHF) band signal and an ultra high frequency (UHF) band signal; a distributing unit receiving the wireless signal from the antenna and distributing and outputting the wireless signal into a wireless signal including the VHF band signal and a wireless signal including the UHF band signal; a VHF processing unit tuning a VHF band with respect to the wireless signal including the VHF band signal distributed through the distributing unit and generating and outputting a VHF intermediate frequency signal; a UHF processing unit tuning a UHF band with respect to the wireless signal including the UHF band signal distributed through the distributing unit and generating and outputting a UHF intermediate frequency signal; and a demodulating unit demodulating the VHF intermediate frequency signal output from the VHF processing unit and the UHF intermediate frequency signal output from the UHF processing unit.

The terrestrial broadcasting receiving module may further include an electrostatic discharge (ESD) protecting unit connected between the antenna and the distributing unit to thereby allow static electricity to flow in a ground.

The ESD protecting unit may include: an ESD protecting capacitor having one terminal connected to an output terminal of the antenna and the other terminal connected to the ground; and an ESD protecting inductor having one terminal connected to the output terminal of the antenna and the other terminal connected to the ground.

The distributing unit may include: a blocking filter blocking a wireless signal for a cellular phone among the wireless signal received from the antenna; a band pass filter passing the VHF band signal among a wireless signal passing through the blocking filter therethrough; and a high pass filter passing the UHF band signal among the wireless signal received from the antenna therethrough.

The blocking filter may include: a first inductor having one terminal connected to an output terminal of the antenna and the other terminal connected to the band pass filter; and a first capacitor having one terminal connected to the output terminal of the antenna and the other terminal connected to the band pass filter.

The band pass filter may include: a second inductor having one terminal connected to an output terminal of the blocking filter and the other terminal connected to a ground; and a second capacitor having one terminal connected to the output terminal of the blocking filter and the other terminal connected to the ground.

The distributing unit may further include a matcher positioned between the blocking filter and the band pass filter to thereby match an impedance therebetween.

The matcher may include a capacitor for matching having one terminal connected to the blocking filter and the other terminal connected to the band pass filter.

The distributing unit may further include a direct current (DC) coupler positioned at an output terminal of the band pass filter and removing a DC component.

The DC coupler may include a DC coupling capacitor having one terminal connected to the band pass filter and the other terminal connected to the VHF processing unit.

The high pass filter may be a surface acoustic wave (SAW) filter.

The distributing unit may further include a filter supporter driving the high pass filter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 1:
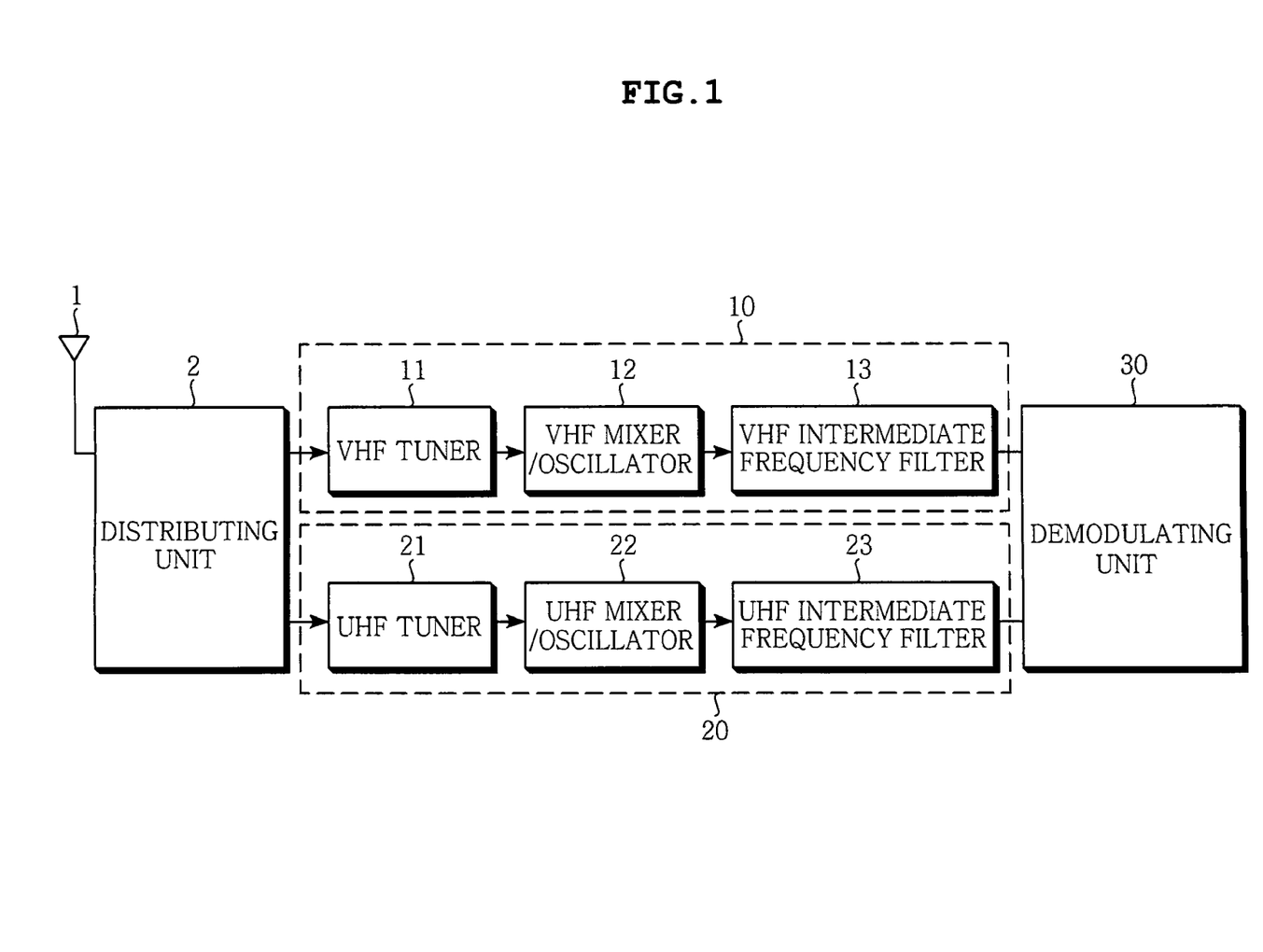
FIG. 1 is a diagram showing a configuration of a terrestrial broadcasting receiving module according to a first preferred embodiment of the present invention.

FIG. 1 is a diagram showing a configuration of a terrestrial broadcasting receiving module according to a first preferred embodiment of the present invention.

Referring to FIG. 1, a terrestrial broadcasting receiving module according to a first preferred embodiment of the present invention is configured to include an antenna 1, a distributing unit 2, a VHF processing unit 10, a UHF processing unit 20, and a demodulating unit 30.

Here, the VHF processing unit 10 includes a VHF tuner 11, a VHF mixer/oscillator 12, and a VHF intermediate frequency filter 13, and the UHF processing unit 20 includes a UHF tuner 21, a UHF mixer/oscillator 22, and a UHF intermediate frequency filter 23.

In this configuration, the antenna 1 receives a wireless signal including a VHF band signal and a UHF band signal and provides the received wireless signal to the distributing unit 2.

In addition, the distributing unit 2 receives the wireless signal including the VHF band signal and the UHF band signal from the antenna, and provides the wireless signal including the VHF band signal to the VHF processing unit 10 and provides the wireless signal including the UHF band signal to the UHF processing unit 20.

Meanwhile, the VHF processing unit 10 tunes a VHF band with respect to the wireless signal including the VHF band signal distributed through the distributing unit 2 and generates and outputs a VHF intermediate frequency signal.

In the VHF processing unit 10, the VHF tuner 11 tunes the VHF band with respect to the wireless signal distributed through the distributing unit 2, and includes an input tuner input tuning the VHF band with respect to a single signal distributed through the distributing unit 2, an RF amplifier amplifying an output signal of the input tuner by a set gain, and an inter-stage tuner inter-stage tuning the VHF band with respect to an output signal of the RF amplifier.

In addition, the VHF mixer/oscillator 12 converts the signal passing through the VHF tuner 11 into an intermediate frequency signal, and includes an oscillator oscillating a resonant frequency of a resonator to thereby provide a VHF oscillating frequency and a mixer mixing the signal passing through the VHF tuner 11 with the oscillating frequency of the oscillator to thereby provide the intermediate frequency signal.

The VHF intermediate frequency filter 13 passes the intermediate frequency signal among the signal output from the VHF mixer/oscillator 12 therethrough.

Next, the UHF processing unit 20 tunes a UHF band with respect to the wireless signal including the UHF band signal distributed through the distributing unit 2 and generates and outputs a UHF intermediate frequency signal.

In the UHF processing unit 20, the UHF tuner 21 tunes the UHF band with respect to the wireless signal distributed through the distributing unit 2, and includes an input tuner input tuning the UHF band with respect to a single signal distributed through the distributing unit 2, an RF amplifier amplifying an output signal of the input tuner by a set gain, and an inter-stage tuner inter-stage tuning the UHF band with respect to an output signal of the RF amplifier.

In addition, the UHF mixer/oscillator 22 converts the signal passing through the UHF tuner 21 into an intermediate frequency signal, and includes an oscillator oscillating a resonant frequency of a resonator to thereby provide a UHF oscillating frequency and a mixer mixing the signal passing through the UHF tuner 21 with the oscillating frequency of the oscillator to thereby provide the intermediate frequency signal.

The UHF intermediate frequency filter 23 passes the intermediate frequency signal among the signal output from the UHF mixer/oscillator 22 therethrough.

Meanwhile, the demodulating unit 30 demodulates the VHF intermediate frequency signal or the UHF intermediate frequency signal.

The terrestrial broadcasting receiving module according to the preferred embodiment of the present invention configured as described above receives the VHF band signal and the UHF band signal using a single antenna 1, thereby making it possible to reduce a cost.

In addition, since the VHF band signal and the UHF band signal received in the antenna 1 are distributed using the distributing unit 2, a switching operation is not required, thereby making it possible to prevent switching loss. Further, according to the preferred embodiment of the present invention, a separate switch device is not required, thereby making it possible to miniaturize a product.

Figure 2:
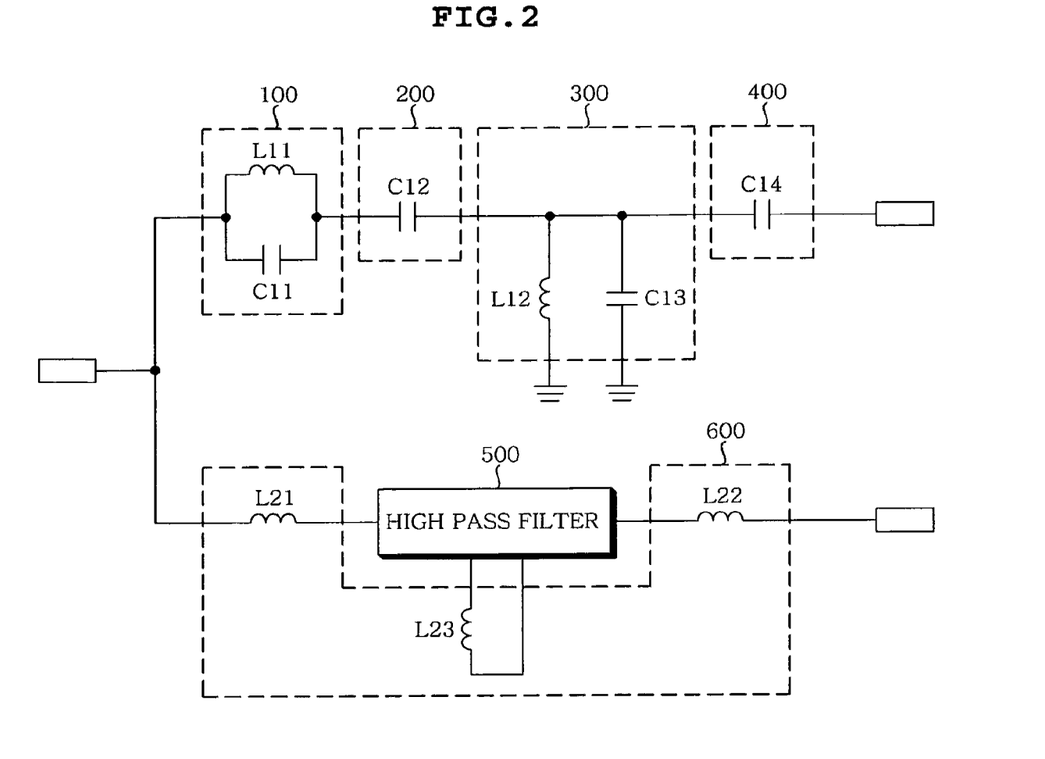
FIG. 2 is a diagram showing an internal configuration of a distributing unit of FIG. 1.

FIG. 2 is a diagram showing an internal configuration of a distributing unit of FIG. 1.

Referring to FIG. 2, the distributing unit of FIG. 1 includes a blocking filter 100, a matcher 200, a band pass filter 300, a direct current (DC) coupler 400, a high pass filter 500, and a filter supporter 600.

The blocking filter 100 is formed of a first inductor L11 and a first capacitor C11 that are connected in parallel with an output terminal of the antenna. That is, the blocking filter 100 is formed of the first inductor L11 having one terminal connected to the output terminal of the antenna and the other terminal connected to the matcher 200 and the first capacitor C11 having one terminal connected to the output terminal of the antenna and the other terminal connected to the matcher 200.

In this configuration of the blocking filter 100, when the distributing unit does not include the matcher 200 that may be omitted, the other terminal of the first inductor L11 is connected to the band pass filter 300 and the other terminal of the first capacitor C11 is also connected to the band pass filter 300.

This blocking filter 100 blocks a wireless signal for a cellular phone that is positioned adjacent to the VHF band signal, for example, a global system for mobile communication (GSM) signal.

In addition, the matcher 200 is formed of a capacitor C12 for matching that has one terminal connected to the blocking filter 100 and the other terminal connected to the band pass filter 300.

The matcher 200 matches an impedance between the blocking filter 100 and the band pass filter 300.

Next, the band pass filter 300 is formed of a second inductor L12 positioned between an output terminal of the matcher 200 and a ground and a second capacitor C13 positioned between the output terminal of the matcher 200 and the ground.

In this configuration of the band pass filter 300, when the distributing unit does not include the matcher 200 that may be omitted, one terminal of the second inductor L12 is connected to the blocking filter 100 and one terminal of the second capacitor C13 is also connected to the blocking filter 100.

The band pass filter 300 as described above passes the VHF band signal of 240 MHz or less among the signal received in the antenna therethrough.

The band pass filter 300 includes the DC coupler 400 connected to an output terminal thereof, wherein the DC coupler 400 removes a DC component and passes the VHF band signal therethrough.

The DC coupler 400 as described above is formed of a DC coupling capacitor C14 having one terminal connected to the band pass filter 300 and the other terminal connected to the VHF processing unit 10 to thereby remove the DC component and pass the VHF band signal therethrough.

Meanwhile, the high pass filter 500 may be connected to the output terminal of the antenna 1, pass the UHF band signal of 470 MHz or more, and be formed of, for example, a surface acoustic wave (SAW) filter.

This high pass filter 500 is driven by the filter supporter 600 formed of three inductors L21 to L23.

Figure 3:
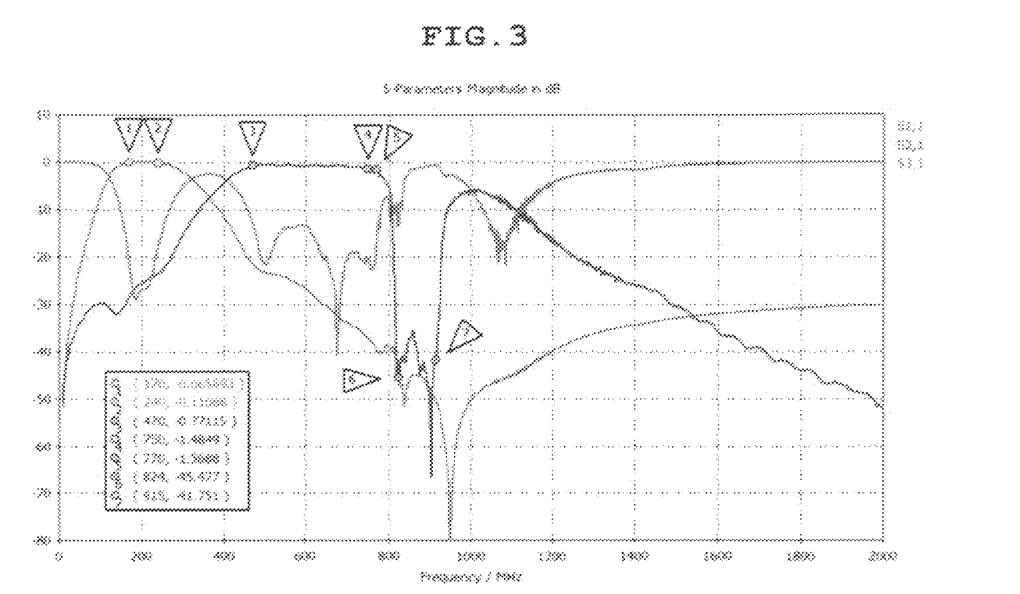
FIG. 3 is a graph showing S parameter transfer characteristics of the distributing unit of FIG. 2.

FIG. 3 is a graph showing S parameter transfer characteristics of the distributing unit of FIG. 2.

Referring to FIG. 3, in an S parameter transfer characteristics curve of the distributing unit of FIG. 2, marks 1 and 2 of S3, 1 indicate transfer characteristics in a band from 170 MHz to 230 MHz, which is a VHF receiving band.

Further, in the S parameter transfer characteristics curve, marks 3 to 5 of S2, 1 indicate transfer characteristics in a band from 470 MHz to 770 MHz, which is a UHF receiving band.

Next, in the S parameter transfer characteristics curve, marks 6 and 7 of S2, 1 indicate transfer characteristics in a band from 824 MHz to 915 MHz, which is a communication frequency band of a cellular phone, and shows blocked performance at 40 dB.

Figure 4:
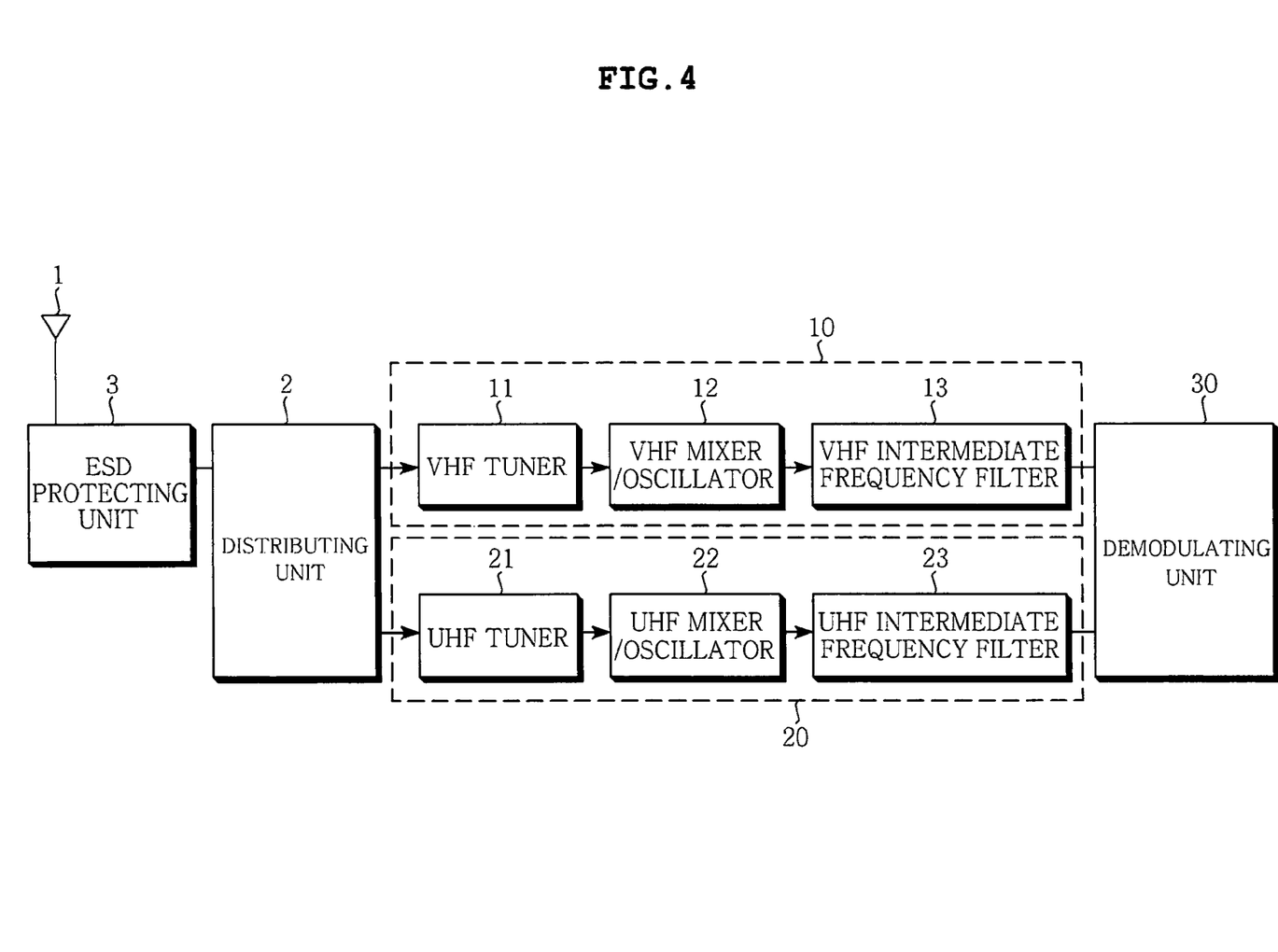
FIG. 4 is a diagram showing a configuration of a terrestrial broadcasting receiving module according to a second preferred embodiment of the present invention.

FIG. 4 is a diagram showing a configuration of a terrestrial broadcasting receiving module according to a second preferred embodiment of the present invention.

Referring to FIG. 4, a terrestrial broadcasting receiving module according to a second preferred embodiment of the present invention is configured to include an antenna 1, a distributing unit 2, an ESD protecting unit 3, a VHF processing unit 10, a UHF processing unit 20, and a demodulating unit 30. Here, the VHF processing unit 10 includes a VHF tuner 11, a VHF mixer/oscillator 12, and a VHF intermediate frequency filter 13, and the UHF processing unit 20 includes a UHF tuner 21, a UHF mixer/oscillator 22, and a UHF intermediate frequency filter 23.

Unlike the terrestrial broadcasting receiving module according to the first preferred embodiment of the present invention, the terrestrial broadcasting receiving module according to the second preferred embodiment of the present invention includes the ESD protecting unit positioned between the antenna 1 and the distributing unit 2, such that it may be protected from electrostatic discharge. Other configurations and operations of the terrestrial broadcasting receiving module according to the second preferred embodiment of the present invention are the same as those of the terrestrial broadcasting receiving module according to the first preferred embodiment of the present invention. Therefore, a detailed description thereof will be omitted.

Figure 5:
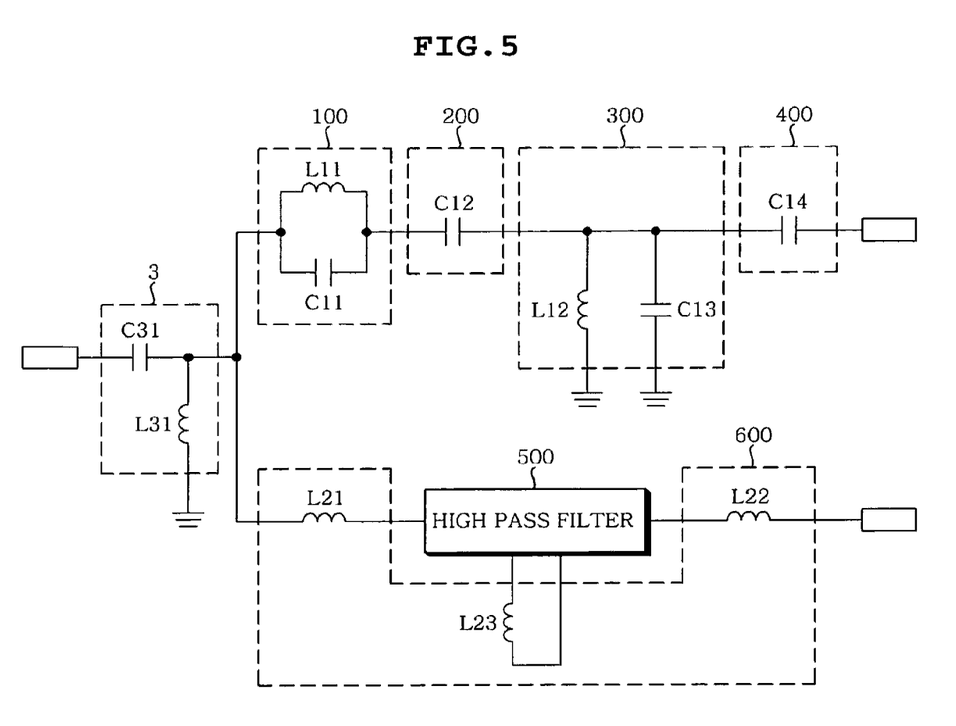
FIG. 5 is a circuit diagram of an electrostatic discharge (ESD) protecting unit and a distributing unit of the terrestrial broadcasting receiving module of FIG. 4.

FIG. 5 is a circuit diagram of an electrostatic discharge protecting unit and a distributing unit of the terrestrial broadcasting receiving module of FIG. 4.

As shown in FIG. 5, the ESD protecting unit 3 is formed of an ESD protecting capacitor C31 connected to an output terminal of the antenna and an ESD protecting inductor L31 connected between an output terminal of the ESD protecting capacitor C31 and a ground, and allows static electricity input through the antenna 1 to flow in the ground, thereby making it possible to protect terrestrial broadcasting receiving module from the static electricity. Other configurations and operations are the same as those of FIG. 2. Therefore, a detailed description thereof will be omitted.

Figure 6:
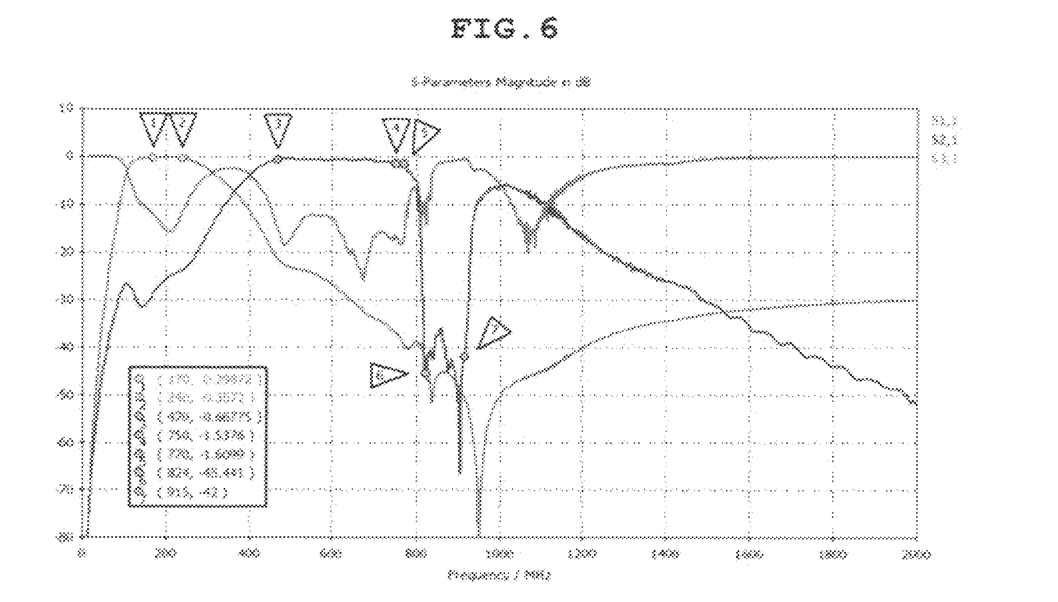
FIG. 6 is a graph showing S parameter transfer characteristics of the distributing unit of FIG. 5.

FIG. 6 is a graph showing S parameter transfer characteristics of the distributing unit of FIG. 5.

Referring to FIG. 6, in an S parameter transfer characteristics curve of the distributing unit of FIG. 5, marks 1 and 2 of S3, 1 indicate transfer characteristics in a band from 170 MHz to 230 MHz, which is a VHF receiving band.

Further, in the S parameter transfer characteristics curve, marks 3 to 5 of S2, 1 indicate transfer characteristics in a band from 470 MHz to 770 MHz, which is a UHF receiving band.

Next, in the S parameter transfer characteristics curve, marks 6 and 7 of S2, 1 indicate transfer characteristics in a band from 824 MHz to 915 MHz, which is a communication frequency band of a cellular phone, and shows blocked performance at 40 dB.

As set forth above, according to the preferred embodiments of the present invention, the VHF wireless signal and the UHF wireless signal are received using only a single antenna, thereby making it possible to reduce a cost.

In addition, according to the preferred embodiments of the present invention, the signal is distributed without a switch, thereby making it possible to minimize switching loss.

Further, according to the preferred embodiment of the present invention, a separate switch device is not required, thereby making it possible to miniaturize a product.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A terrestrial broadcasting receiving module comprising:
   an antenna receiving a wireless signal including a very high frequency (VHF) band signal and an ultra high frequency (UHF) band signal;
   a distributing unit receiving the wireless signal from the antenna and distributing and outputting the wireless signal into a wireless signal including the VHF band signal and a wireless signal including the UHF band signal;
   a VHF processing unit tuning a VHF band with respect to the wireless signal including the VHF band signal distributed through the distributing unit and generating and outputting a VHF intermediate frequency signal;
   a UHF processing unit tuning a UHF band with respect to the wireless signal including the UHF band signal distributed through the distributing unit and generating and outputting a UHF intermediate frequency signal; and
   a demodulating unit demodulating the VHF intermediate frequency signal output from the VHF processing unit and the UHF intermediate frequency signal output from the UHF processing unit,
   wherein the distributing unit includes:
      a blocking filter blocking a wireless signal for a cellular phone among the wireless signal received from the antenna;
      a band pass filter passing the VHF band signal among a wireless signal passing through the blocking filter therethrough; and
      a high pass filter passing the UHF band signal among the wireless signal received from the antenna therethrough, and
   wherein the blocking filter includes:
      a first inductor having one terminal connected to an output terminal of the antenna and the other terminal connected to the band pass filter; and
      a first capacitor having one terminal connected to the output terminal of the antenna and the other terminal connected to the band pass filter.

2. The terrestrial broadcasting receiving module as set forth in claim 1, further comprising an electrostatic discharge (ESD) protecting unit connected between the antenna and the distributing unit to thereby allow static electricity to flow in a ground.

3. A terrestrial broadcasting receiving module comprising:
   an antenna receiving a wireless signal including a very high frequency (VHF) band signal and an ultra high frequency (UHF) band signal;
   a distributing unit receiving the wireless signal from the antenna and distributing and outputting the wireless signal into a wireless signal including the VHF band signal and a wireless signal including the UHF band signal;
   a VHF processing unit tuning a VHF band with respect to the wireless signal including the VHF band signal distributed through the distributing unit and generating and outputting a VHF intermediate frequency signal;
   a UHF processing unit tuning a UHF band with respect to the wireless signal including the UHF band signal distributed through the distributing unit and generating and outputting a UHF intermediate frequency signal;
   a demodulating unit demodulating the VHF intermediate frequency signal output from the VHF processing unit and the UHF intermediate frequency signal output from the UHF processing unit; and
   an electrostatic discharge (ESD) protecting unit connected between the antenna and the distributing unit to thereby allow static electricity to flow in a ground,
   wherein the distributing unit includes:
      a blocking filter blocking a wireless signal for a cellular phone among the wireless signal received from the antenna;
      a band pass filter passing the VHF band signal among a wireless signal passing through the blocking filter therethrough; and
      a high pass filter passing the UHF band signal among the wireless signal received from the antenna therethrough, and
   wherein the ESD protecting unit includes:
      an ESD protecting capacitor having one terminal connected to the antenna; and
      an ESD protecting inductor having one terminal connected to an output terminal of the ESD protecting capacitor and the other terminal connected to the ground.

4. The terrestrial broadcasting receiving module as set forth in claim 1, wherein the band pass filter includes:
   a second inductor having one terminal connected to an output terminal of the blocking filter and the other terminal connected to a ground; and
   a second capacitor having one terminal connected to the output terminal of the blocking filter and the other terminal connected to the ground.

5. The terrestrial broadcasting receiving module as set forth in claim 1, wherein the distributing unit further includes a matcher positioned between the blocking filter and the band pass filter to thereby match an impedance therebetween.

6. The terrestrial broadcasting receiving module as set forth in claim 5, wherein the matcher includes a capacitor for matching having one terminal connected to the blocking filter and the other terminal connected to the band pass filter.

7. The terrestrial broadcasting receiving module as set forth in claim 1, wherein the distributing unit further includes a direct current (DC) coupler positioned at an output terminal of the band pass filter and removing a DC component.

8. The terrestrial broadcasting receiving module as set forth in claim 7, wherein the DC coupler includes a DC coupling capacitor having one terminal connected to the band pass filter and the other terminal connected to the VHF processing unit.

* * * * *